(12) United States Patent
Ancimer et al.

(10) Patent No.: US 9,228,460 B2
(45) Date of Patent: Jan. 5, 2016

(54) SYSTEMS AND METHODS FOR THERMAL MANAGEMENT OF AFTERTREATMENT SYSTEM COMPONENTS

(71) Applicant: Cummins Inc., Columbus, IN (US)

(72) Inventors: Richard J. Ancimer, Columbus, IN (US); Vivek A. Sujan, Columbus, IN (US); Ashwin Vyas, Columbus, IN (US); Guoqiang Li, Indianapolis, IN (US); Fan Zeng, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/061,957

(22) Filed: Oct. 24, 2013

(65) Prior Publication Data

US 2015/0113947 A1  Apr. 30, 2015

(51) Int. Cl.
| | |
|---|---|
| *F01N 3/00* | (2006.01) |
| *F01N 3/021* | (2006.01) |
| *F01N 3/10* | (2006.01) |
| *F01N 3/20* | (2006.01) |
| *F01N 9/00* | (2006.01) |
| *F02D 41/02* | (2006.01) |
| *F02D 41/00* | (2006.01) |

(52) U.S. Cl.
CPC ............... *F01N 3/021* (2013.01); *F01N 3/106* (2013.01); *F01N 3/2033* (2013.01); *F01N 3/2066* (2013.01); *F01N 9/00* (2013.01); *F02D 41/0055* (2013.01); *F02D 41/025* (2013.01); *F01N 2900/0411* (2013.01); *F01N 2900/08* (2013.01); *F01N 2900/1602* (2013.01); *F02D 2200/0802* (2013.01)

(58) Field of Classification Search
USPC ................... 60/274, 284, 286, 297, 301, 303
See application file for complete search history.

(56) References Cited

U.S. PATENT DOCUMENTS

| | | | |
|---|---|---|---|
| 1,939,959 A | 12/1933 | Dick | |
| 3,626,815 A | 12/1971 | Fingeroot | |
| 4,549,445 A | 10/1985 | Kaufman | |
| 5,115,725 A | 5/1992 | Horiuchi | |
| 5,413,074 A | 5/1995 | Horiuchi | |
| 5,794,582 A | 8/1998 | Horiuchi | |
| 6,892,530 B2 | 5/2005 | Montreuil et al. | |
| 7,146,802 B2 | 12/2006 | Lee | |
| 7,313,911 B2 | 1/2008 | Pfeifer et al. | |
| 7,814,747 B2 * | 10/2010 | Bandl-Konrad et al. | 60/297 |
| 7,818,960 B2 | 10/2010 | Gonze et al. | |
| 8,166,749 B2 * | 5/2012 | Gady | 60/277 |
| 8,484,951 B2 * | 7/2013 | Fuse | 60/286 |
| 8,607,553 B2 * | 12/2013 | Delvecchio et al. | 60/301 |
| 8,776,495 B2 * | 7/2014 | Gonze et al. | 60/284 |
| 8,839,612 B2 * | 9/2014 | Scherer et al. | 60/301 |
| 2006/0021332 A1 | 2/2006 | Gaiser | |
| 2009/0217645 A1 | 9/2009 | Sisken et al. | |
| 2009/0223207 A1 | 9/2009 | Ren | |
| 2010/0024390 A1 | 2/2010 | Wills et al. | |
| 2010/0101218 A1 | 4/2010 | Gabe et al. | |
| 2012/0023905 A1 | 2/2012 | Yezerets et al. | |

* cited by examiner

*Primary Examiner* — Binh Q Tran
(74) *Attorney, Agent, or Firm* — Taft Stettinius & Hollister LLP (57) ABSTRACT

An exhaust aftertreatment system includes an oxidation catalyst and a selective catalytic reduction (SCR) catalyst disposed in an exhaust stream of an internal combustion engine. A stay warm thermal management strategy is employed after warm-up of the aftertreatment system is complete to maintain the aftertreatment system above a temperature providing a desired performance threshold of one or more components of the aftertreatment system, such as the oxidation catalyst or the SCR catalyst.

25 Claims, 5 Drawing Sheets

Fig. 5

SYSTEMS AND METHODS FOR THERMAL MANAGEMENT OF AFTERTREATMENT SYSTEM COMPONENTS

TECHNICAL FIELD

The technical field relates generally to exhaust aftertreatment systems for internal combustion engines, and more particularly to thermal management and control of aftertreatment systems.

BACKGROUND

Presently available selective catalytic reduction ("SCR") systems adsorb ammonia ($NH_3$) on a catalyst and then react the $NH_3$ with $NO_x$ to reduce the $NO_x$ emissions. The $NH_3$ is typically stored as a less reactive composition, e.g. urea, and hydrolyzed into $NH_3$ in the exhaust system as required to reduce the $NO_x$ emitted by the engine. At certain system operating conditions, the $NH_3$-based $NO_x$ reduction mechanism breaks down due to lack of $NH_3$ storage capacity on the SCR catalyst, due to an inability to rapidly hydrolyze urea into $NH_3$, or for other reasons. Various factors limit low temperature performance of aftertreatment systems due to the evaporation, thermolysis and hydrolysis of the urea solution and the kinetics of the chemical processes, even in the presence of a catalyst. When the $NH_3$-based $NO_x$ reduction mechanism breaks down, the net $NO_x$ emissions of the system increase.

Current techniques for management of aftertreatment system temperature involve warm-up strategies to rapidly increase the SCR catalyst from a cold start condition to a temperature effective to hydrolyze urea to manage $NO_x$ emissions. Certain operating conditions after warm-up of the SCR catalyst cause the catalyst temperature to drop below an optimal or desired temperature for effective hydrolysis of urea. Current techniques to maintain SCR catalyst temperature above a minimum threshold include, for example, controlling actuators in the air handling systems and adjusting the combustion processes in the cylinders to increase exhaust gas temperature. However, these techniques can be inefficient, and can further increase engine output of particulates, requiring the aftertreatment system to include a particulate filter. In addition, therefore, improvements in this technology are needed.

SUMMARY

One embodiment is a unique system to thermally manage an aftertreatment system component temperature, such as an SCR catalyst or oxidation catalyst temperature, after the aftertreatment system component has warmed up above a warm-up temperature threshold from a cold start. After warm-up of the aftertreatment system component is completed, a stay warm mode of operation is employed under certain operating conditions to maintain the aftertreatment system component temperature at or above a stay warm temperature threshold.

The stay warm mode of operation raises the aftertreatment system component temperature to a target temperature determined as a function of engine speed and load, where the target temperature corresponds to a desired performance threshold for the aftertreatment system component. The stay warm thermal management strategy includes at least one of in-cylinder reformate dosing and external reformate dosing into the exhaust gas so that the exothermic reaction created by oxidation of the reformate with an oxidation catalyst of the aftertreatment system increases the exhaust temperature and therefore the aftertreatment system component temperature to the target temperature. Other embodiments include unique methods, systems, and apparatus to provide a stay warm thermal management strategy for the aftertreatment system component.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
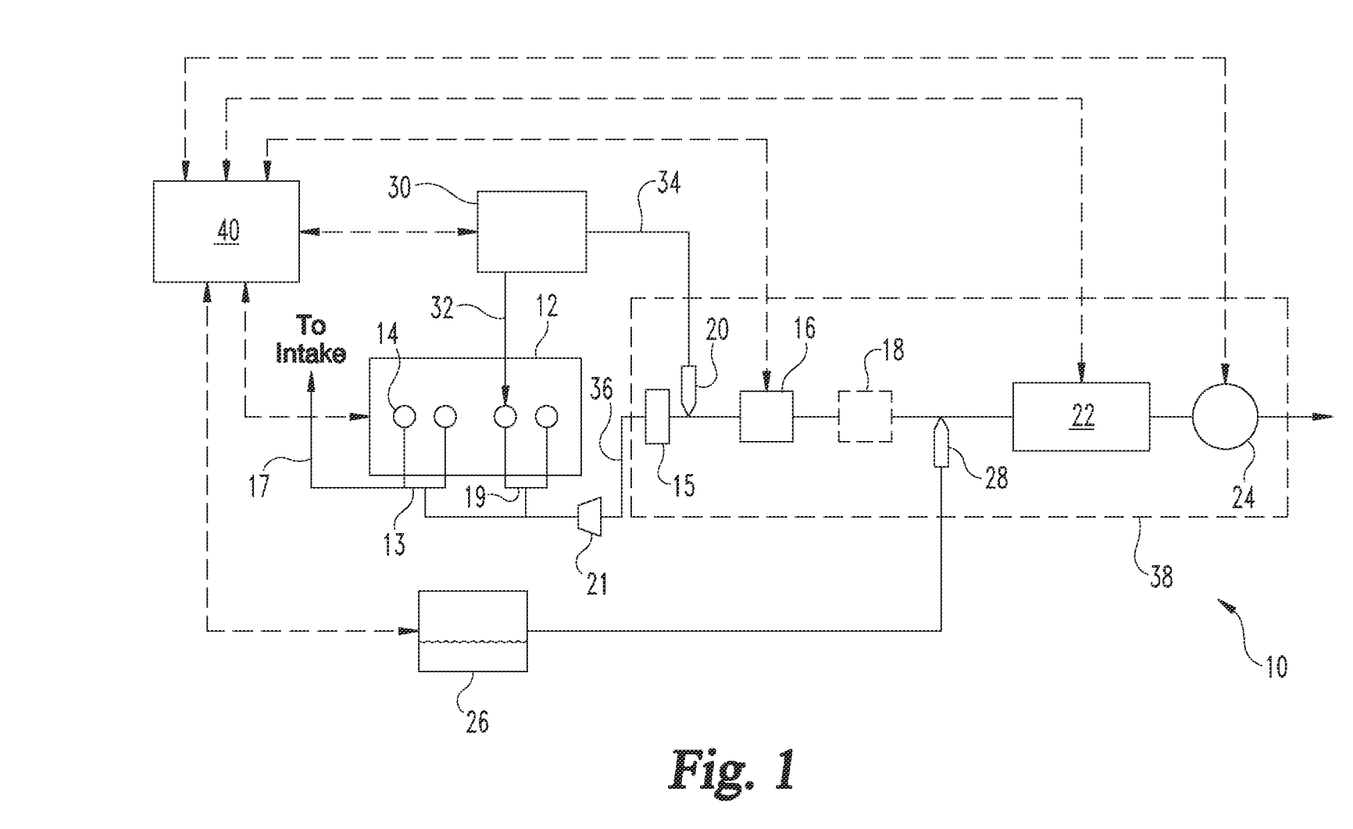
FIG. 1 is a schematic illustration of an exemplary aftertreatment component thermal management system for an internal combustion engine.

With reference to FIG. 1, there is illustrated a system 10 including an internal combustion engine 12 which is configured to output mechanical power to system 10 and to output exhaust gas to an exhaust flow path 36. System 10 is illustrated schematically and may be a car, truck, bus, boat, recreational vehicle, construction equipment, locomotive, marine power, or another type of vehicle. Other embodiments include an engine provided in non-vehicular applications such as a generator set. The exhaust output by engine 12 includes $NO_x$ which is to be reduced using an exhaust aftertreatment system 38.

In one embodiment, exhaust aftertreatment system 38 includes an oxidation catalyst 16 in fluid communication with exhaust gas in exhaust flow path 36 that is operable to catalyze oxidation of one or more compounds in the exhaust gas. Oxidation catalyst 16 can oxidize, for example, unburned hydrocarbons and NO to $NO_2$. Exhaust aftertreatment system 38 may further include an optional diesel particulate filter 18 in fluid communication with exhaust gas in exhaust flow path 36 to reduce the level of particulates in exhaust gas flowing through exhaust flow path 36. In a particular embodiment, diesel particulate filter 18 is a catalyzed soot filter. Other embodiments utilize other types of diesel particulate filters. In still another embodiment, a particulate filter is omitted from system 10.

Exhaust aftertreatment system 38 may include a reductant injector 28 and an aftertreatment system component downstream of reductant injector 28, such as SCR catalyst 22. Reductant injector 28 is supplied with reductant from a reductant reservoir 26 and is operable to inject reductant into exhaust flow path 36. In an exemplary embodiment the reductant is an aqueous solution of urea which decomposes to provide ammonia. Other embodiments utilize different reductants, for example, aqueous solutions of ammonia, anhydrous ammonia, or other reductants suitable for $NO_x$ emissions reduction. Reductant injected into exhaust flow path 36 is provided to SCR catalyst 22 is mixed with the exhaust gas and is operable to catalyze the reduction of $NO_x$. In certain embodiments, the SCR catalyst 22 includes a zeolite or vanadium based catalyst, but any type of SCR catalyst known in the art is contemplated herein.

Exhaust aftertreatment system 38 further includes a hydrocarbon (HC) injector 20 which is supplied with hydrocarbons from HC source 30. Hydrocarbons can include unburned hydrocarbons, a reformate of an on-board fuel that is reformed by a reformer to, for example, $H_2$ and CO. HC source 30 can be the primary fuel storage source for engine 12, or be a secondary fuel storage source. HC injector 20 is operationally coupled to the exhaust flow path 36 at a position upstream of SCR catalyst 22. HC injector 20 is operable response to an external HC dosing command from a controller 40 to externally dose hydrocarbons in the exhaust gas in exhaust flow path 36. External dosing of hydrocarbons, as used herein, is dosing of hydrocarbons into exhaust flow path 36 downstream of cylinders 14 of engine 12 and upstream of at least one component of exhaust aftertreatment system 38.

In addition or alternatively, HC reservoir 30 is connected to at least one of cylinders 14 of engine 12 to provide in-cylinder hydrocarbon dosing. The connection to cylinders 14 can be through, for example, a direct injector and/or common rail fuel system (not shown) operable to inject hydrocarbons into the combustion chambers at a very late post injection fuel timing where at least a portion of the very late post injection hydrocarbons do not combust in cylinders 14 of engine 12. The common rail fuel system is responsive to an in-cylinder HC dosing command from controller 40 to inject an amount of hydrocarbons in-cylinder into one or more of the cylinders 14. In one embodiment, a first portion of cylinders 14 is connected to a first exhaust manifold 15 that is connected to an exhaust gas recirculation (EGR) system 17 connected to the intake of engine 12. A second portion of cylinders 14 is connected to a second exhaust manifold 19 that does not provide exhaust flow to EGR system 17. Outlets from first and second exhaust manifolds 17, 19 recombine upstream of or at one or more inlets of turbine 21 of a turbocharger. In-cylinder dosing is provided only to the second portion of cylinders 14 that do not provide exhaust flow to EGR system 17, preventing injected hydrocarbons from being present in the EGR flow.

In the illustrated embodiment, HC injector 20 is connected downstream of a close-coupled oxidation catalyst 15 that separates the oxidation of hydrocarbons dosed in-cylinder from the downstream oxidation catalyst 16. In another embodiment, HC injector 20 is upstream of the close coupled catalyst 15. However, embodiments without close-coupled catalyst 15 are also contemplated.

Exhaust flow path 36, illustrated schematically in FIG. 1, may be provided in a variety of physical configurations, including configurations other than those illustrated. In an exemplary embodiment an exhaust flow path proceeds from the output of a turbocharger (not shown) of engine 12 through a conduit to a structure containing oxidation catalyst 16 and diesel particulate filter 18, through a second conduit to a structure containing SCR catalyst 22 and through another conduit which outlets to the ambient environment. Embodiments may also include an ammonia oxidation AMOX catalyst (not shown) at a position downstream of the SCR catalyst 22, which is operable to catalyze the reaction of $NH_3$ which slips past the SCR catalyst 22.

System 10 includes controller 40 which functionally executes certain operations for engaging hydrocarbon dosing in a $NO_x$ reduction system. Controller 40 forms a portion of a processing subsystem including one or more computing devices having memory as well as a number of inputs and outputs for interfacing with various sensors and systems of system 10. Controller 40 can be an electronic circuit comprised of one or more components, including digital circuitry, analog circuitry, or both. Controller 40 may be a single device, a distributed device, or multiple controllers. Controller 40 may include one or more control algorithms defined by operating logic in the form of software instructions, hardware instructions, firmware instructions, dedicated hardware, or the like.

In one form, controller 40 is of a programmable microcontroller solid-state integrated circuit type that includes memory and one or more central processing units. The memory of controller 40 includes of one or more components and can be of any of volatile or nonvolatile, solid-state, optical media, magnetic media, combinations of these, or other types of memory. Controller 40 can include signal conditioners, signal format converters (such as analog-to-digital and digital-to-analog converters), limiters, clamps, filters, and the like as needed to perform various control and regulation operations described herein. Controller 40, in an exemplary embodiment, may be a type of controller sometimes referred to as an electronic or engine control module (ECM), electronic or engine control unit (ECU) or the like, that is directed to the regulation and control of engine operation. Alternatively, controller 40 may be dedicated to the control of just the operations described herein or to a subset of controlled aspects of system 10.

Controller 40 is in operative communication with a temperature sensor 24 which provides controller 40 with information indicative of the temperature of the exhaust system and aftertreatment components. In other embodiments, information from temperature sensors in various locations is utilized to determine information indicative of the temperature of oxidation catalyst and/or SCR catalyst 22. The location of the temperature sensor 24 is exemplary and non-limiting. A temperature sensor 24 may be positioned within the SCR catalyst 22, at an inlet to SCR catalyst 22, upstream of the SCR catalyst 22, at an inlet to oxidation catalyst 16, and/or at an outlet of oxidation catalyst 16. Multiple temperature sensors 24 may be present with an average or weighted average of sensors utilized to determine the temperature of the exhaust aftertreatment system 38, oxidation catalyst 16, SCR catalyst 22, any aftertreatment system component, of the exhaust gas at any location in aftertreatment system 38, and/or at any location or part of engine 12.

Figure 2:
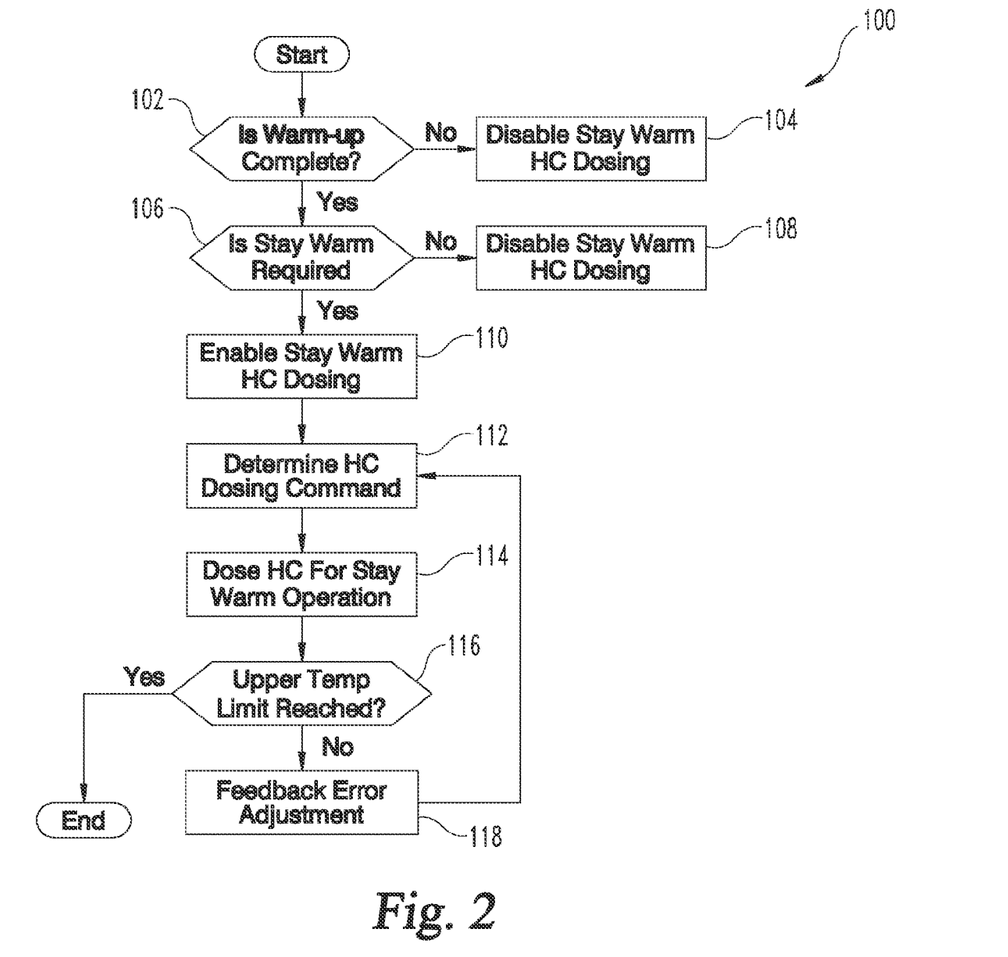
FIG. 2 is a flow diagram of a procedure for a stay warm mode of operation for thermal management of an aftertreatment system component.

Referring to FIG. 2, controller 40 may be configured to operate according to procedure 100 to operate system 10 in a stay warm mode of operation which provides thermal management to keep aftertreatment system 38 at or above a stay warm temperature threshold that provides a desired performance efficiency standard of the oxidation catalyst 16 and/or SCR catalyst 22. The schematic flow diagram and related description which follows provides an illustrative embodiment of performing procedures for enabling and operating in a stay warm mode of operation. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

Procedure 100 includes a conditional 102 to determine whether a warm-up mode of operation for the aftertreatment system is complete. Conditional 102 isolates the different modes of thermal management and prevents the stay warm mode of operation from interfering with warm-up mode of operation of aftertreatment system 38. The warm-up mode of operation is typically designed to rapidly create a threshold operating temperature that brings, for example, oxidation catalyst 16 and/or SCR catalyst 22 out of a cold start or low temperature condition to a warmed-up temperature threshold. If conditional 102 is negative, procedure 100 continues at operation 104 and disables or maintains a disablement of the HC dosing used for the stay warm mode of operation. It should be understood, however, the HC dosing for the warm-up mode of operation can be enabled.

If conditional 102 is positive, procedure 100 continues at conditional 106 to determine if a stay warm mode of operation is required. A stay warm mode of operation can be required, for example, upon detection of a temperature drop below a stay warm temperature threshold, which may be the same or different than the warmed up temperature threshold. The temperature drop can be determined at the outlet of oxidation catalyst 16, the inlet of SCR catalyst 22, or by any temperature sensor or sensors in the exhaust system indicative of the temperature drop of one or more aftertreatment components, as discussed above with respect to temperature sensor 24. The stay warm temperature threshold can be a fixed value, but can also be a value that varies according to engine speed and load so that the stay warm mode of operation is optimized to perform as needed to respond to actual operating conditions, increasing efficiency. In one specific example, the stay warm temperature threshold ranges from 280° C. to 320° C., although other stay warm temperature thresholds are contemplated and not precluded. If a need for stay warm mode of operation is not detected, procedure 100 continues at operation 108 and disables or maintains disablement of stay warm mode HC dosing.

If conditional 106 is positive, procedure 100 continues at operation 110 and enables HC dosing for the stay warm mode of operation. In addition to the detection of the temperature drop below the stay warm temperature threshold, enablement of the stay-warm mode of operation may include various operating conditions being true. For example, exhaust flow can be required to be between a lower exhaust flow threshold and an upper exhaust flow threshold. In another example, the oxidation catalyst 16 can be required to be at or above light-off temperature so that dosed hydrocarbons are effectively oxidized.

Once the stay warm mode of operation is enabled at operation 110, procedure 100 continues at operation 112 to determine a HC dosing command that will increase the temperature of the at least one aftertreatment component, such as oxidation catalyst 16 or SCR catalyst 22, to a target operating temperature through the exothermic reaction of the hydrocarbons that increases the temperature of the exhaust gas. In a further embodiment, the HC dosing command is limited to avoid HC slip through SCR catalyst 22. Procedure 100 continues at operation 114 to dose the HC amount for the stay warm mode of operation to create an exothermic reaction that increases the exhaust gas temperature, thus increasing the temperature of the aftertreatment component toward the target operating temperature.

The exothermic reaction can be created, for example, by in-cylinder dosing of hydrocarbons for oxidation on close-coupled catalyst 15 and/or oxidation catalyst 16, by external dosing of hydrocarbons into the exhaust gas downstream of any turbocharger for oxidation by oxidation catalyst 16, or a combination of in-cylinder and external HC dosing. The oxidation of hydrocarbons is an exothermic reaction that increases the temperature of the exhaust gas and thus the temperature of aftertreatment component to the target operating temperature. The stay warm HC dosing strategy also allows engine thermal management strategies to be employed that, for example, reduce the charge flow to increase exhaust temperatures but, since external heating of the exhaust gas is provided in the stay warm operating mode, allow limits in the charge flow reduction to satisfy engine-out particulate emissions limits, thus eliminating the need for a particulate filter 18.

The temperature of the aftertreatment component is measured during the stay warm mode of operation in response to the HC dosing at operation 114. Procedure 100 includes a conditional 116 to determine if an upper temperature limit, or alternatively the target temperature, is reached. If conditional 116 is positive, the stay warm mode of operation ends. If conditional 116 is negative, procedure 100 includes an operation 118 to determine a feedback error adjustment to be applied in determining the HC dosing command. The current temperature at, for example, the inlet of SCR catalyst 22 or the outlet of oxidation catalyst 16, is compared to an expected temperature, such as the target temperature, based on the amount of HC dosed, and a feedback error adjustment is determined based on this temperature difference. The feedback error adjustment is considered at operation 112 in determining an adjusted HC dosing command that increases the temperature from the current temperature to the target operating temperature that accounts for system variations from the parameters used in determining the preceding HC dosing command. The feedback control allows a rapid response in obtaining aftertreatment component temperatures that reach the target temperature. After the target temperature is reached, a hysteresis value or hysteresis conditions can be applied to the stay warm temperature threshold and the target temperature or upper temperature limit to prevent frequent re-triggering of the warm-up mode of operation.

Figure 3:
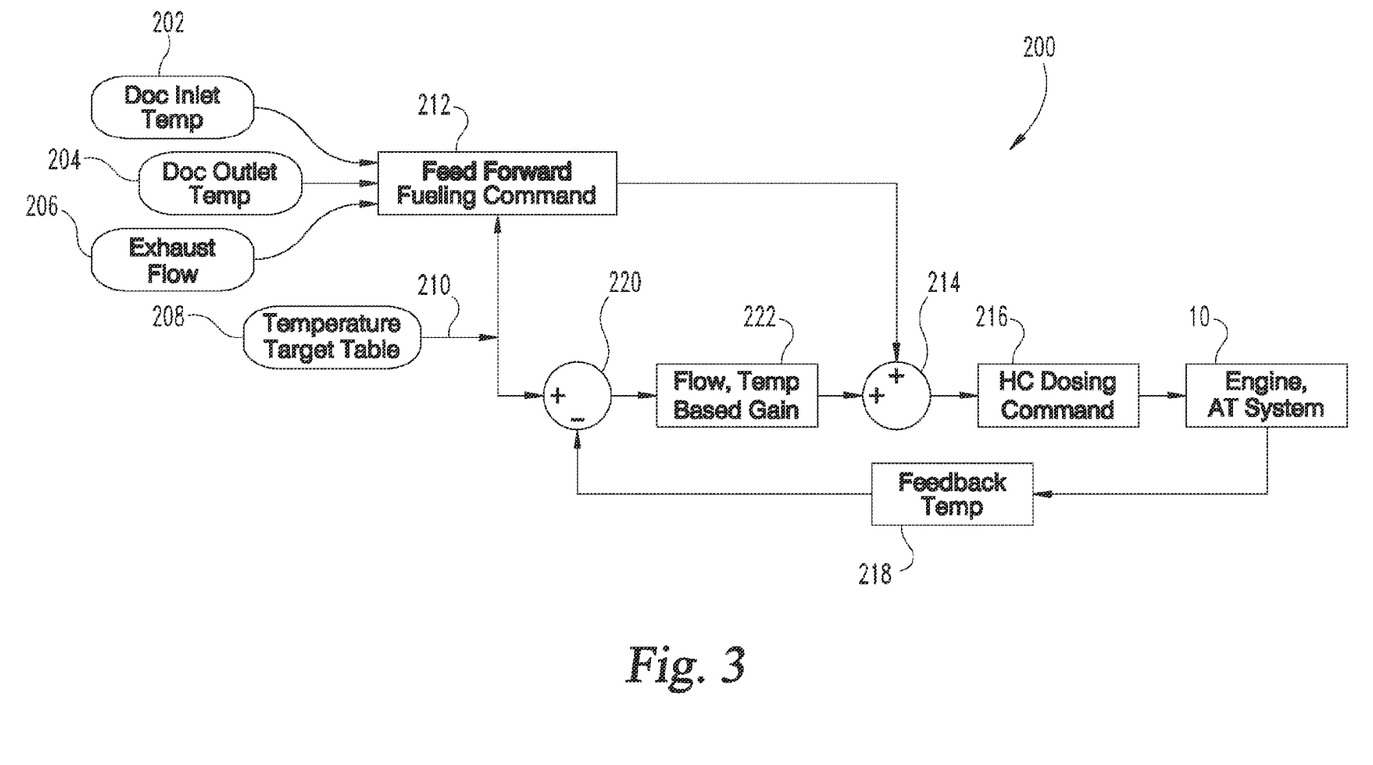
FIG. 3 is a diagram illustrating an exemplary control operation for the stay warm mode of operation for thermal management of the aftertreatment system component.

Referring now to FIG. 3, there is shown a schematic of a control operation 200 for a stay warm mode of operation to thermally manage one or more aftertreatment components, such as oxidation catalyst 16 or SCR catalyst 22. As discussed above, the stay warm mode of operation is initiated in response to certain enable conditions being met, such as a temperature drop of the aftertreatment system, a warm-up mode of operation being complete, exhaust flows between lower and upper thresholds, and oxidation catalyst 16 being above a light-off temperature. Control operation 200 receives a number of inputs, such a diesel oxidation catalyst (DOC) inlet temperature 202, DOC outlet temperature 204, and exhaust flow 206. In addition, a temperature target table 208 provides a target temperature input 210 for the aftertreatment component, such as the outlet of oxidation catalyst 16 or inlet of SCR catalyst 22, based on engine speed and engine load.

Feedforward fuelling command 212 from HC source 30 is determined in response to DOC inlet temperature 202, DOC outlet temperature 204, exhaust flow 206, and the target temperature 210. The feedforward fuelling command 212 provides a hydrocarbon amount to dose in the exhaust system that is determined to increase the exhaust temperature from a current operating temperature to the target temperature. Feedforward fuelling command 212 is provided to a summer 214, and from summer 214 a HC dosing command 216 is determined and provided to control HC dosing to the engine and aftertreatment system 10 via at least one of an in-cylinder dosing or external dosing of hydrocarbons.

A feedback temperature 218 is determined in response to the HC injection resulting from HC dosing command 216 and provided to a comparator 220 for comparison with the target temperature 210. A gain error 222 is determined based on this temperature comparison and current exhaust flow conditions. Gain error 222 is provided to summer 214 to provide feedback control of the feedforward fuelling command 212 to determine HC dosing command 216. The feedback control 240 can be a proportional-integral-derivative (PID) controller, a proportional-integral (PI) controller, or any other type of control loop feedback mechanism. In other embodiments, adaptive controls can be applied such that, for example, if consistent offsets are measured during feedback control in the fuelling amount required to achieve the target temperature and the actual temperature that results from the commanded fuelling, the feedforward fuelling command 212 is automatically adjusted for the learned offset to avoid wind up of the feedback control.

In certain embodiments, the controller 40 includes one or more modules structured to functionally execute the operations of the controller 40. The description herein including modules emphasizes the structural independence of the aspects of the controller, and illustrates one grouping of operations and responsibilities of the controller 40. Other groupings that execute similar overall operations are understood within the scope of the present application. Modules may be implemented in hardware and/or software on computer readable medium, and modules may be distributed across various hardware or software components.

Controller 40 is in operative interconnection with various elements of system 10 as illustrated in FIG. 1 with dashed lines extending between controller 40 and various elements of system 10. These operative interconnections may be implemented in a variety of forms, for example, through input/output interfaces coupled via wiring harnesses, a datalink, a hardwire or wireless network and/or a lookup from a memory location. In other instances all or a portion of the operative interconnection between controller 40 and an element of system 10 may be virtual. For example, a virtual input indicative of an operating parameter may be provided by a model implemented by controller 40 or by another controller which models an operating parameter based upon other information.

Figure 4:
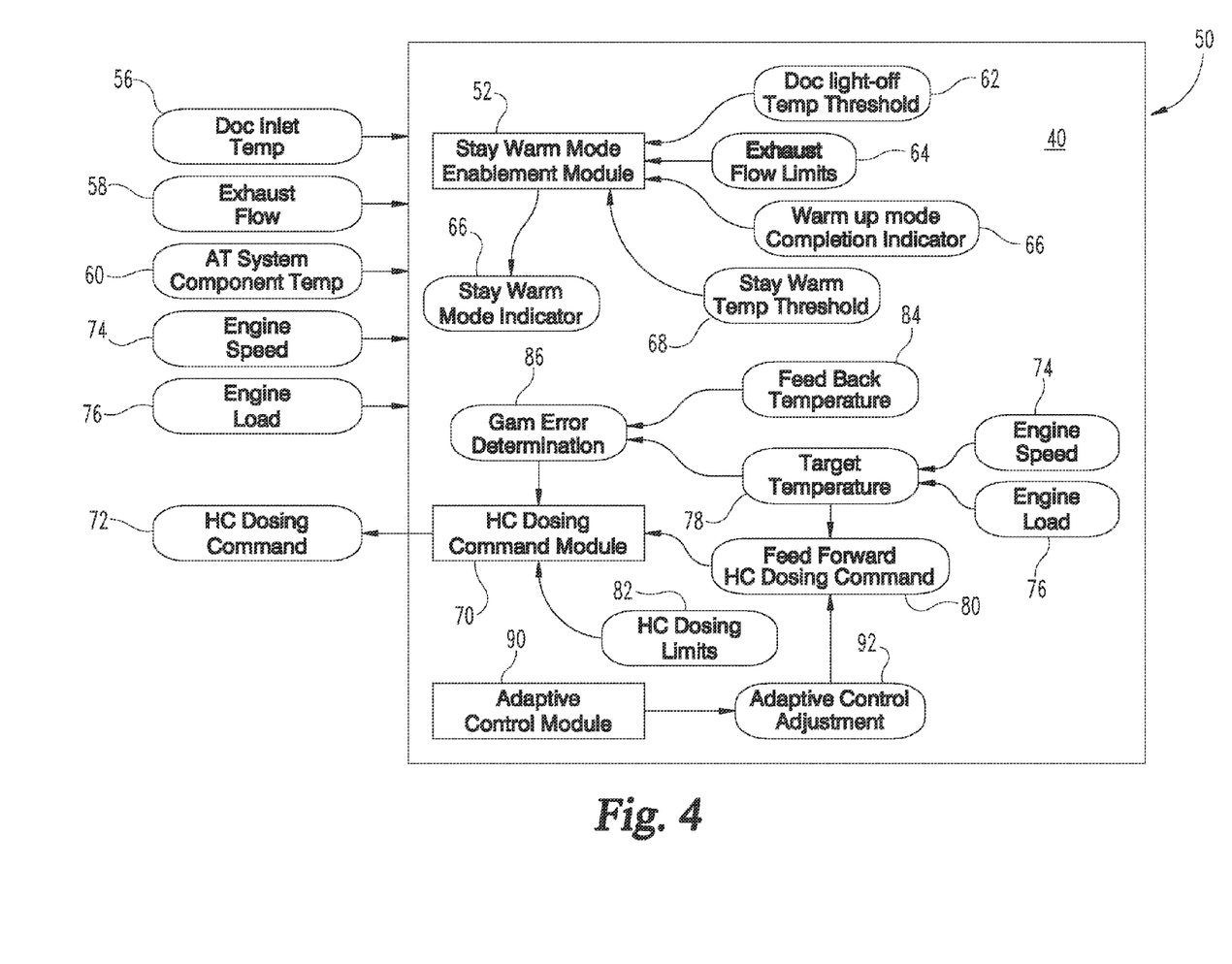
FIG. 4 is a diagram illustrating an exemplary control apparatus configured to perform a stay warm mode of operation for thermal management of the aftertreatment system component.

FIG. 4 represents a control apparatus 50 that includes at least one controller 40 with various components illustrated as representative modules, inputs, outputs, and intermediate data parameters. Controller 40 includes a stay warm mode enablement module 52 that determines a stay warm mode indicator 54 as ON or OFF. Stay warm mode enablement module 52 receives DOC inlet temperature input 56, exhaust flow input 58, and aftertreatment (AT) system component temperature input 60. These inputs are compared against a DOC light-off temperature threshold 62, exhaust flow limits 64, a warm-up mode completion indicator 66, and a stay warm temperature threshold 68 to determine if stay warm mode indicator 54 is ON or OFF.

Controller 40 also includes a HC dosing command module 70 that is configured to determine a HC dosing command 72 based on current operating conditions, operating condition requirements, and operating condition limits in response to stay warm thermal indicator 54 indicating an ON condition. Controller 40 receives engine speed input 74 and engine load input 76. Inputs 74, 76 may be provided by any suitable indicator thereof based on the operating of engine 12, such as crankshaft speed, crankshaft torque, fuelling amounts, etc. The engine speed input 74 and engine load input 76 are used to determine a target temperature 78 of the exhaust system based on current operating conditions.

The target temperature 78 is used along with the DOC inlet temperature input 56 and a DOC outlet temperature input to determine a feedforward fuelling or HC dosing command 80 that increases the exhaust system temperature toward the target temperature 78 by in-cylinder HC dosing, external HC dosing, or a combination of in-cylinder and external HC dosing. The feedforward HC dosing command 80 is subjected to HC dosing limits 82 that prevent HC slip in from the aftertreatment system 38. In a further embodiment, an adaptive control module 90 is provided that determines an adaptive control adjustment 92 to adapt feedforward hydrocarbon dosing command 80 by learning a consistent offset of the target temperature 78 from feedback temperature 84 over time and adjusting the feedforward hydrocarbon dosing command 80 for the offset.

Controller 40 further receives a feedback temperature 84 that is compared with target temperature 78 in making a gain error determination 86. Gain error determination 86 is provided to HC dosing command module 70 to provide feedback control of the feedforward HC dosing command 80 in determining the HC dosing command 72. Once the target temperature or upper temperature limit is reached, HC dosing command module 70 is disabled until a subsequent stay warm mode indicator 54 is ON.

Figure 5:
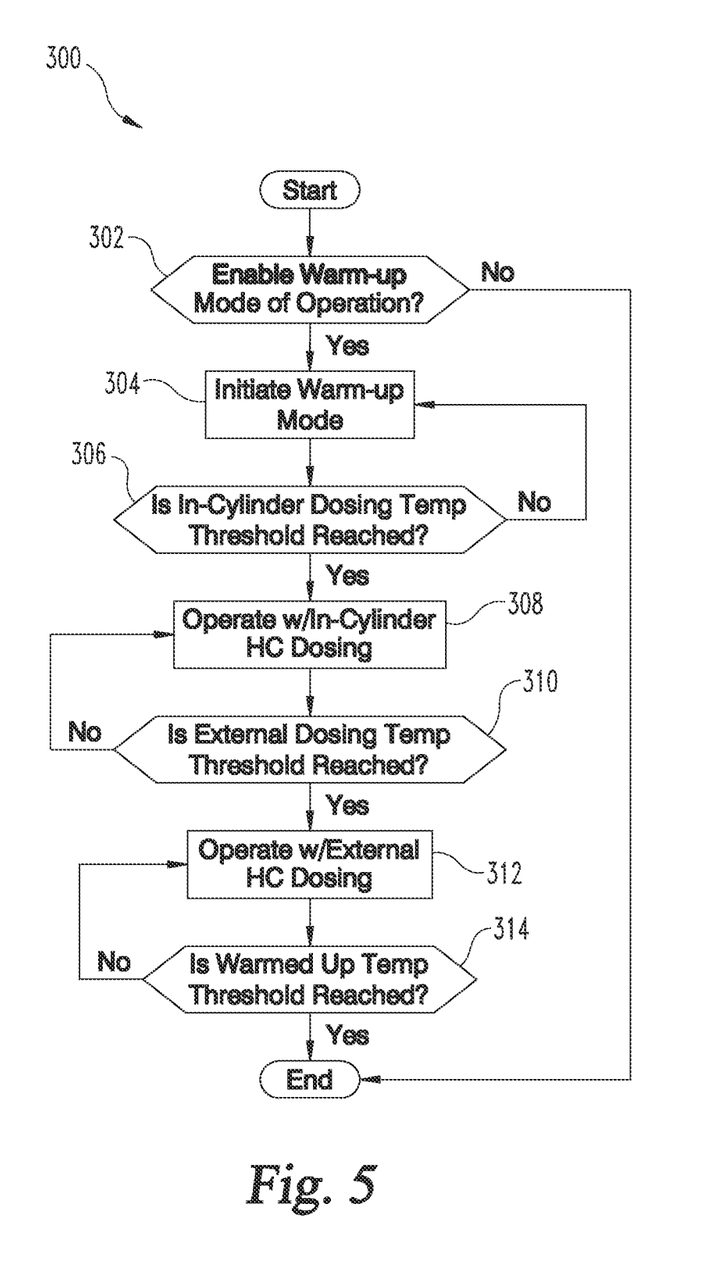
FIG. 5 is a flow diagram of a procedure for a warm-up mode of operation for thermal management of an aftertreatment system component.

In another aspect of system 10, controller 40 is configured to provide a HC dosing strategy during a warm-up mode of operation of aftertreatment system 38. As shown in FIG. 5, the HC dosing strategy during the warm-up mode of operation includes a procedure 300 that includes a conditional 302 to determine if a warm-up mode of operation of aftertreatment system 38 is needed. The warm-up mode of operation can be initiated, for example, in response to the aftertreatment system or aftertreatment system component falling below a low temperature threshold, a cold start condition, the aftertreatment system component falling below a predetermined amount below a warmed up temperature threshold, or the stay warm mode of operation becoming disabled. In one specific example, the low temperature threshold is about 250° C. and the warmed up temperature threshold ranges from 280° C. to 320° C., although other temperatures are contemplated and not precluded. If conditional 302 is negative, procedure 300 ends. If conditional 302 is positive, procedure 300 continues at operation 304 to initiate a warm-up mode of operation.

The warm-up mode of operation can use any suitable control of the components and/or actuators associated with system 10 to increase the temperature of the aftertreatment system 38, including exhaust gas recirculation (EGR) control, turbine inlet control, charge cooling bypass, intake throttle control, fuel injection timing, etc. During the warm-up mode of operation, procedure 300 includes a conditional 306 to determine if the aftertreatment system has reached an in-cylinder dosing temperature threshold. In one embodiment, the in-cylinder dosing temperature threshold is about 220° C., although other temperatures are contemplated and not precluded. If conditional 306 is negative, procedure 300 returns to operation 304 to continue operating in the warm-up mode. If conditional 306 is positive, procedure 300 includes an operation 308 to initiate in-cylinder HC dosing to provide hydrocarbons in the exhaust system that are oxidized by oxidation catalyst 16 and/or close-coupled catalyst 15.

Procedure 300 continues after operation 308 at conditional 310 to determine if an external dosing temperature threshold is reached. The external dosing temperature threshold is greater than the in-cylinder dosing temperature threshold. In one embodiment, the external dosing temperature threshold is about 250° C., although other temperatures are contemplated and not precluded. If conditional 310 is negative, procedure 300 returns to operation 308 to continue operation in the warm-up mode with in-cylinder HC dosing. If conditional 310 is positive, procedure 300 continues at operation 312 and operates with external HC dosing while in-cylinder HC dosing is disabled. External HC dosing at operation 312 doses hydrocarbons directly into the exhaust stream upstream of oxidation catalyst 16.

In one embodiment, the in-cylinder dosing temperature threshold corresponds to a temperature at which the oxidation catalyst is effective to light-off in-cylinder dosed hydrocarbons. Since oxidation catalyst 16 has lower light-off temperatures for in-cylinder dosed hydrocarbons as compared to externally dosed hydrocarbons due to the vaporization of the hydrocarbons injected in the cylinder, in-cylinder HC dosing can be employed at lower temperatures to provide a more rapid increase in temperature during the warm-up mode of operation. In addition, at sufficiently high in-cylinder and exhaust manifold temperatures, the hydrocarbons can partially react, which could contribute to a lower light-off temperature of the oxidation catalyst 16. In-cylinder dosing of hydrocarbons, however, suffers from drawbacks such as potentially forming deposits in the exhaust manifold and in any turbocharger upstream of the oxidation catalyst 16. The external dosing temperature threshold corresponds to a light-off temperature of the oxidation catalyst that is effective to light-off externally dosed hydrocarbons. By switching to external dosing of hydrocarbons when the external dosing temperature threshold is reached, the negative impacts of in-cylinder dosing are minimized while allowing HC dosing to be employed throughout the warm-up mode of operation to more rapidly increase aftertreatment system temperatures during the warm-up mode of operation. In certain embodiments, the formulation of oxidation catalyst 16 can be designed for low light-off temperatures to further minimize the use of in-cylinder dosing.

Procedure 300 continues after operation 312 at conditional 314 to determine if the warmed up temperature threshold is reached. If conditional 314 is negative, procedure 300 returns to operation 312 and continues external HC dosing during the warm-up mode of operation. If conditional 314 is positive, procedure 300 ends since the warm-up operation is completed.

As is evident from the figures and text presented above, a variety of aspects and embodiments according to the present disclosure are contemplated. According to one aspect, a method includes warming up an exhaust aftertreatment system component in an exhaust system connected to an internal combustion engine above a warmed-up temperature threshold indicating completion of a warm-up mode of operation of the internal combustion engine connected to the exhaust system; initiating a stay warm operating mode to maintain the exhaust aftertreatment system component above a stay warm temperature threshold providing a desired performance of the aftertreatment system component; and dosing hydrocarbons for receipt into the exhaust system in response to initiating the stay warm operating mode to warm the exhaust aftertreatment system component to a target temperature.

In one embodiment, initiating the stay warm operating mode includes any one or combination of determining the warm-up mode of operation is complete; determining a flow of exhaust gas in the exhaust system is between upper and lower threshold exhaust flow rates; determining a temperature drop of the exhaust aftertreatment component below the stay warm temperature threshold; and determining a temperature of an oxidation catalyst in the exhaust system is at or above a light-off temperature.

In another embodiment, the stay warm temperature threshold is less than the target temperature. In a further embodiment, the target temperature is determined as a function of an engine speed and an engine load of the internal combustion engine. In a refinement of this embodiment, the engine load is determined from a fuelling rate to the internal combustion engine.

In another embodiment, the exhaust aftertreatment system component is a selective catalytic reduction (SCR) catalyst. In yet another embodiment, the exhaust aftertreatment system component is an oxidation catalyst upstream of a selective catalytic reduction (SCR) catalyst.

In another embodiment, warming up the exhaust aftertreatment system component includes in-cylinder dosing of hydrocarbons into one or more cylinders of the internal combustion engine during operation of the internal combustion engine when the temperature of an oxidation catalyst in the exhaust system reaches an in-cylinder dosing temperature threshold. In a refinement of this embodiment, warming up the exhaust aftertreatment system component includes disabling in-cylinder dosing of hydrocarbons and externally dosing hydrocarbons into the exhaust gas downstream of the one or more cylinders during operation of the internal combustion engine when the temperature of the oxidation catalyst reaches an external dosing temperature threshold that is greater than the in-cylinder dosing temperature threshold.

In another embodiment, dosing hydrocarbons into the exhaust system during the stay warm operating mode includes externally dosing hydrocarbons into the exhaust gas downstream of one or more cylinders of the internal combustion engine. In yet another embodiment, dosing hydrocarbons into the exhaust system during the stay warm operating mode includes in-cylinder dosing of hydrocarbons into one or more cylinders of the internal combustion engine. In a further embodiment, the method includes determining a feedforward amount of hydrocarbons to dose in response to the target temperature, the flow of exhaust gas, an inlet temperature of the oxidation catalyst, and an outlet temperature of the oxidation catalyst. In a refinement of this embodiment, the method further includes adjusting the feedforward amount of hydrocarbons to dose in response to a difference between a current temperature of the aftertreatment system component and the target operating temperature.

According to another aspect, a system includes an internal combustion engine including at least one cylinder and an exhaust system connected to the internal combustion engine. The exhaust system includes a plurality of aftertreatment system components including an oxidation catalyst and a selective catalytic reduction (SCR) catalyst to receive an exhaust stream produced by operation of the internal combustion engine. The system further includes a hydrocarbon source connected to at least one of the exhaust system and the at least one cylinder for injection of hydrocarbons therein, and a controller connected to the internal combustion engine, the exhaust system and the hydrocarbon source. The controller is configured to initiate a stay warm operating mode in response to a temperature drop of the at least one aftertreatment component below a stay warm temperature threshold, determine a target temperature of at least one of the aftertreatment system components as a function of a speed and a load of the internal combustion engine, and dose hydrocarbons from the hydrocarbon source for receipt into the exhaust system in response to initiating the stay warm operating mode to warm the at least one of the exhaust aftertreatment system components to the target temperature.

In one embodiment of the system, the controller is further configured to initiate the stay warm operating mode in response to a flow of exhaust gas in the exhaust system being between predetermined upper and lower threshold flow rates and a temperature of the oxidation catalyst being at or above a light-off temperature. In another embodiment, the plurality of aftertreatment system components further include a particulate filter.

In another embodiment of the system, the hydrocarbon source is connected to the at least one cylinder and to the exhaust system downstream of the at least one cylinder and upstream of the oxidation catalyst. In a refinement of this embodiment, the plurality of aftertreatment system components include a close coupled catalyst upstream of the oxidation catalyst and the hydrocarbon source is connected to the exhaust system upstream of the close-coupled catalyst. In another refinement of this embodiment, the controller is configured to determine a low temperature condition of the plurality of aftertreatment system components, where the low temperature condition is less than the stay warm temperature threshold, and initiate a warm-up mode of operation to increase a temperature of the at least one aftertreatment component above a warmed up temperature threshold. In a further refinement, during the warm-up mode of operation the controller is configured to selectively dose hydrocarbons into the at least one cylinder when the oxidation catalyst reaches an in-cylinder dosing temperature threshold and into the exhaust system when the oxidation catalyst reaches an external dosing temperature threshold. The external dosing temperature threshold is greater than the in-cylinder dosing threshold, and the warmed up temperature threshold is greater than the external dosing temperature threshold.

According to another aspect, an apparatus is provided that includes a controller operably connectable to an exhaust aftertreatment system, a hydrocarbon source, and an internal combustion engine connected to an exhaust system including the exhaust aftertreatment system. The controller includes a stay warm mode enablement module configured to provide a positive stay warm mode indicator in response to an inlet temperature of an oxidation catalyst of the exhaust aftertreatment system being at or above a light-off temperature, an exhaust flow value from the internal combustion engine being between upper and lower exhaust flow limits, and a temperature of an aftertreatment component in the exhaust aftertreatment system dropping below a stay warm temperature threshold after the temperature exceeded a warmed-up temperature threshold. The controller also includes a hydrocarbon dosing command module configured to determine a hydrocarbon dosing command for injection of an amount of hydrocarbons for receipt into the exhaust aftertreatment system to warm the exhaust aftertreatment system to a target temperature in response to the positive stay warm mode indicator.

According to one embodiment, the target temperature varies according to a speed and a load of the internal combustion engine. In another embodiment, the hydrocarbon dosing command module is configured to externally dose hydrocarbons from the hydrocarbon source into the exhaust system downstream of one or more cylinders of the internal combustion engine. In yet another embodiment, the hydrocarbon dosing command module is configured to in-cylinder dose hydrocarbons from the hydrocarbon source into one or more cylinders of the internal combustion engine. In yet another embodiment, the hydrocarbon dosing command module is configured to determine a feedforward amount of hydrocarbons to dose in response to the target temperature, the flow of exhaust gas, an inlet temperature of the oxidation catalyst, and an outlet temperature of the oxidation catalyst. In a further embodiment, the apparatus includes an adaptive control module configured to determine a consistent offset of the current temperature of the aftertreatment system component from the target temperature over time and adjust the feedforward amount of hydrocarbons to dose in response to the offset.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
    determining a low temperature condition of an aftertreatment system component in an exhaust system connected to an internal combustion engine, wherein the low temperature condition is less than a stay warm temperature threshold of the aftertreatment system component, and further comprising a source of hydrocarbons and the internal combustion engine including one or more cylinders, wherein the source of hydrocarbons is connected to the one or more cylinders and connected to the exhaust system downstream of the one or more cylinders and upstream of an oxidation catalyst;
    initiating a warm-up mode of operation to increase a temperature of the aftertreatment component above a warmed-up temperature threshold;
    warming up the exhaust aftertreatment system component above the warmed-up temperature threshold indicating completion of the warm-up mode of operation of the internal combustion engine connected to the exhaust system;
    initiating a stay warm operating mode to maintain the exhaust aftertreatment system component above a stay warm temperature threshold providing a desired performance of the aftertreatment system component, wherein initiating the stay warm operating mode includes:
        determining the warm-up mode of operation is complete;
        determining a temperature drop of the exhaust aftertreatment component below the stay warm temperature threshold; and
    dosing hydrocarbons from the hydrocarbon source for receipt into the exhaust system upstream of the oxidation catalyst in response to initiating the stay warm operating mode to warm the exhaust aftertreatment system component to a target temperature, wherein warming up the exhaust aftertreatment system component includes in-cylinder dosing of the hydrocarbons from the hydrocarbon source into the one or more cylinders of the internal combustion engine during operation of the internal combustion engine when the temperature of the oxidation catalyst in the exhaust system reaches an in-cylinder dosing temperature threshold.

2. The method of claim 1, wherein the stay warm temperature threshold is less than the target temperature.

3. The method of claim 1, wherein the target temperature is determined as a function of an engine speed and an engine load of the internal combustion engine.

4. The method of claim 3, wherein the engine load is determined from a fuelling rate to the internal combustion engine.

5. The method of claim 1, wherein the exhaust aftertreatment system component is a selective catalytic reduction (SCR) catalyst.

6. The method of claim 5, wherein the oxidation catalyst is located upstream of the selective catalytic reduction (SCR) catalyst.

7. The method of claim 1, wherein initiating the stay warm operating mode further includes:
   determining a flow of exhaust gas in the exhaust system is between upper and lower threshold exhaust flow rates; and
   determining a temperature of an oxidation catalyst in the exhaust system is at or above a light-off temperature.

8. The method of claim 1, wherein warming up the exhaust aftertreatment system component includes:
   disabling in-cylinder dosing of the hydrocarbons and externally dosing the hydrocarbons into the exhaust gas downstream of the one or more cylinders during operation of the internal combustion engine when the temperature of the oxidation catalyst reaches an external dosing temperature threshold that is greater than the in-cylinder dosing temperature threshold, wherein the warmed up temperature threshold is greater than the external dosing temperature threshold.

9. The method of claim 1, wherein dosing the hydrocarbons into the exhaust system during the stay warm operating mode includes externally dosing the hydrocarbons into the exhaust gas downstream of one or more cylinders of the internal combustion engine.

10. The method of claim 1, wherein in-cylinder dosing of hydrocarbons includes dosing of the hydrocarbons into one or more cylinders of the internal combustion engine that do not provide exhaust gas to an exhaust gas recirculation system.

11. The method of claim 1, further comprising determining a feedforward amount of the hydrocarbons to dose in response to the target temperature, the flow of exhaust gas, an inlet temperature of the oxidation catalyst, and an outlet temperature of the oxidation catalyst.

12. The method of claim 11, further comprising adjusting the feedforward amount of the hydrocarbons to dose in response to a difference between a current temperature of the aftertreatment system component and the target operating temperature.

13. The method of claim 11, further comprising providing an adaptive control adjustment of the feedforward amount of the hydrocarbons to dose in response to an offset over time between a fuelling amount required to achieve the target operating temperature and the feedforward fuelling amount.

14. The method of claim 1, wherein the hydrocarbons includes one of unburned hydrocarbons and a reformate.

15. A system, comprising:
   an internal combustion engine including at least one cylinder;
   an exhaust system connected to the internal combustion engine, the exhaust system including a plurality of aftertreatment system components including an oxidation catalyst and a selective catalytic reduction (SCR) catalyst to receive an exhaust stream produced by operation of the internal combustion engine;
   a hydrocarbon source connected to at least one of the exhaust system and the at least one cylinder for injection of hydrocarbons therein upstream of the oxidation catalyst, wherein the hydrocarbon source is connected to the at least one cylinder and to the exhaust system downstream of the at least one cylinder and upstream of the oxidation catalyst; and
   a controller connected to the internal combustion engine, the exhaust system and the hydrocarbon source, wherein the controller is configured to:
      determine a low temperature condition of the plurality of aftertreatment system components, wherein the low temperature condition is less than a stay warm temperature threshold, and initiate a warm-up mode of operation to increase a temperature of the at least one aftertreatment component above a warmed up temperature threshold
      initiate a stay warm operating mode in response to a temperature drop of the at least one aftertreatment component below the stay warm temperature threshold;
      determine a target temperature of at least one of the aftertreatment system components based on a speed and a load of the internal combustion engine; and
      dose the hydrocarbons from the hydrocarbon source for receipt into the exhaust system in response to initiating the stay warm operating mode to warm the at least one of the exhaust aftertreatment system components to the target temperature, wherein during the warm-up mode of operation the controller is configured to selectively dose the hydrocarbons into the at least one cylinder when the oxidation catalyst reaches an in-cylinder dosing temperature threshold and into the exhaust system when the oxidation catalyst reaches an external dosing temperature threshold, wherein the external dosing temperature threshold is greater than the in-cylinder dosing threshold, and the warmed up temperature threshold is greater than the external dosing temperature threshold.

16. The system of claim 15, wherein the controller is further configured to initiate the stay warm operating mode in response to a flow of exhaust gas in the exhaust system being between predetermined upper and lower threshold flow rates and a temperature of the oxidation catalyst being at or above a light-off temperature.

17. The system of claim 15, wherein the plurality of aftertreatment system components include a close coupled catalyst upstream of the oxidation catalyst and the hydrocarbon source is connected to the exhaust system upstream of the close-coupled catalyst.

18. The system of claim 15, wherein the internal combustion engine includes a plurality of cylinders, and a first portion of the plurality of cylinders are flow coupled to an intake of the internal combustion engine through an exhaust gas recirculation system, and a second portion of the plurality of cylinders are not flow coupled to the exhaust gas recirculation system, and the hydrocarbon source is connected only to the second portion of the plurality of cylinders and not the first portion.

19. The system of claim 15, wherein the plurality of aftertreatment system components further include a particulate filter.

20. The system of claim 15, wherein the hydrocarbons include one of a reformate and unburned hydrocarbons.

21. An apparatus, comprising:
- a controller operably connectable to an exhaust aftertreatment system, a hydrocarbon source, and an internal combustion engine connected to an exhaust system including the exhaust aftertreatment system, wherein the internal combustion engine includes one or more cylinders, and the hydrocarbon source is connected to the one or more cylinders and to the exhaust system downstream of the one or more cylinders, wherein the controller includes:
  - a stay warm mode enablement module configured to provide a positive stay warm mode indicator in response to an inlet temperature of an oxidation catalyst of the exhaust aftertreatment system being at or above a light-off temperature, an exhaust flow value from the internal combustion engine being between upper and lower exhaust flow limits, and a temperature of an aftertreatment component in the exhaust aftertreatment system dropping below a stay warm temperature threshold after the temperature exceeded a warmed-up temperature threshold; and
  - a hydrocarbon dosing command module configured to determine a hydrocarbon dosing command for injection of an amount of hydrocarbons for receipt into the exhaust aftertreatment system to warm the exhaust aftertreatment system to a target temperature in response to the positive stay warm mode indicator, wherein each of the modules is implemented in at least one of hardware and a non-transitory computer readable medium, and further wherein:
  - the controller is configured to determine a low temperature condition of the aftertreatment component, wherein the low temperature condition is less than the stay warm temperature threshold, and initiate a warm-up mode of operation to increase a temperature of the aftertreatment component above the warmed up temperature threshold; and
  - during the warm-up mode of operation the hydrocarbon dosing command module is configured to selectively dose the hydrocarbons in cylinder into the at least one cylinder when the oxidation catalyst reaches an in-cylinder dosing temperature threshold and externally into the exhaust system downstream of the at least one cylinder and upstream of the oxidation catalyst when the oxidation catalyst reaches an external dosing temperature threshold, wherein the external dosing temperature threshold is greater than the in-cylinder dosing threshold, and the warmed u temperature threshold is greater than the external dosing temperature threshold.

22. The apparatus of claim 21, wherein the target temperature varies according to a speed and a load of the internal combustion engine.

23. The apparatus of claim 21, wherein the hydrocarbon dosing command module is configured to determine a feedforward amount of hydrocarbons to dose in response to the target temperature, the flow of exhaust gas, an inlet temperature of the oxidation catalyst, and an outlet temperature of the oxidation catalyst.

24. The apparatus of claim 23, wherein the hydrocarbon dosing command module is configured to adjust the feedforward amount of hydrocarbons to dose in response to a difference between a current temperature of the aftertreatment system component and the target temperature.

25. The apparatus of claim 24, further comprising an adaptive control module configured to determine an offset over time between a fuelling amount to achieve the target temperature and the feedforward fuelling command and adjust the feedforward amount of hydrocarbons to dose in response to the offset.

* * * * *